(12) United States Patent
Vignet

(10) Patent No.: US 9,507,700 B1
(45) Date of Patent: Nov. 29, 2016

(54) GENERIC METHOD FOR AUTOMATED SOFTWARE TESTING

(71) Applicant: SAP SE, Walldorf (DE)

(72) Inventor: Pierre Vignet, San Francisco, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/978,415

(22) Filed: Dec. 22, 2015

(51) Int. Cl.
  *G06F 9/44* (2006.01)
  *G06F 11/36* (2006.01)
(52) U.S. Cl.
  CPC .................. *G06F 11/3688* (2013.01)
(58) Field of Classification Search
  CPC ......... G06F 11/3688; G06F 8/34; G06F 8/33
  USPC .................. 717/124, 110, 111, 113
  See application file for complete search history.

(56) References Cited

U.S. PATENT DOCUMENTS

| | | | | |
|---|---|---|---|---|
| 2010/0312728 A1* | 12/2010 | Feng | ................. | G06F 17/30896 706/12 |
| 2012/0290920 A1* | 11/2012 | Crossley | .................. | G06F 8/38 715/234 |
| 2012/0311429 A1* | 12/2012 | Decker | ............... | G06F 17/2247 715/234 |
| 2014/0089786 A1* | 3/2014 | Hashmi | ............... | G06F 17/2247 715/234 |
| 2014/0298161 A1* | 10/2014 | Shu | ...................... | G06F 17/2247 715/234 |

* cited by examiner

*Primary Examiner* — Anna Deng
(74) *Attorney, Agent, or Firm* — Schwegman Lundberg & Woessner, P.A.

(57) ABSTRACT

An application comprising pages and navigations between the pages is parsed into a DOM for each page. A determination is made whether each page creates, updates or deletes an object of the application based on the DOM for the page. If the page does not create, update or delete, the DOM for the page is traversed to collect navigation links to other pages. If the page does create, update or delete, the DOM for the page is traversed to collect, input nodes, buttons for creating, updating or deleting and navigation links to other pages. Each page of the application is visited and tested. A navigation test of each of the collected links of the page is performed with one forward and one backward navigation of the link. A function test of each collected button of the page is performed by using the button and evaluating results based on specified rules.

18 Claims, 9 Drawing Sheets

FIG. 3

GENERIC METHOD FOR AUTOMATED SOFTWARE TESTING

TECHNICAL FIELD

The present disclosure relates a generic method for automated testing of software applications. In an example embodiment, after parsing application data into document object models (DOMs) for each page of the application, each of the DOMs is traversed and the application is generically tested with the a minimum of input data and with failures resulting in multiple retry attempts before a failure is noted and the testing continues.

BACKGROUND

Quality assurance test automation is the use of software applications (e.g., scripts) to run automated tests of other software applications (e.g., web application) in order to improve the level of quality of a software application. Many such quality assurance test automation software applications exist, and they share many qualities in order to be effective. For example, testing software is often capable of being used with multiple operating systems, multiple software languages, multiple web browsers and multiple web mobile browsers. Furthermore, a quality assurance test automation software application usually provides an integrated development environment (IDE) with: a graphical user interface (GUI) for recording a user's actions (e.g., as scripts) while using an application (e.g., web browser) and converting the recorded actions into various programming languages, a programming interface (e.g., a web driver) for developing and running recorded scripts on different applications (e.g., web or web mobile browsers), and application server(s) to allow for remote and distributed execution of test scripts in parallel on multiple platforms.

Test scripts are small programs used to test a software application. A software application can create, read, update, and delete software objects. For example a sales application may offer the option to create a customer account object. In testing, this task (e.g., create a customer account object) is usually performed by one test script, since the small test scripts are best suited to test only one functionality (for example one test script to create an account, one to read the account, one to update the account and one to delete it). The functions of an application that create, read, update and delete a software object are often referred to as the "CRUD" of the object. In testing software applications test scripts often search for specific elements (e.g., objects) of the application to interact with (for example, a web application element is a hypertext markup language (HTML) web page element). A test script can find these application elements using methods called locators. These locators' methods takes argument values (e.g., fixed predetermined values) for parameters to find the matching application elements. A parameter has an attribute and a value. Attributes are, for example, attributes of web application elements such as identifier (ID), name, class attributes, HTML tag name, Cascade Style Sheet (CCS), full or partial text links, and the like. Values are simply the values of the attribute. For example in the web element: <input class="name" id="name" type="text" placeholder="Enter name . . . "/>, class is an attribute and name is the value of the class attribute. Regular Expressions (Regex) may be used to define a parameter's attribute and values. Queries are used by the locators to traverse a DOM and find specific application elements. Once an application element (e.g., web element) is found, a test script manipulates it and the results may be evaluated. When data for input into an input node of a DOM are required for a test (e.g., user password), the input data can be stored separately from the testing environment (e.g., in one or more central data storages) in a method known as Data Driven Testing (DDT).

BRIEF DESCRIPTION OF DRAWINGS

The present disclosure is illustrated by way of example and not limitation in the figures of the accompanying drawings, in which like references indicate similar elements and in which:

FIG. 3 is an illustration of example pages of an application GUI for creating a new customer account object for the application.

DETAILED DESCRIPTION

Figure 1:
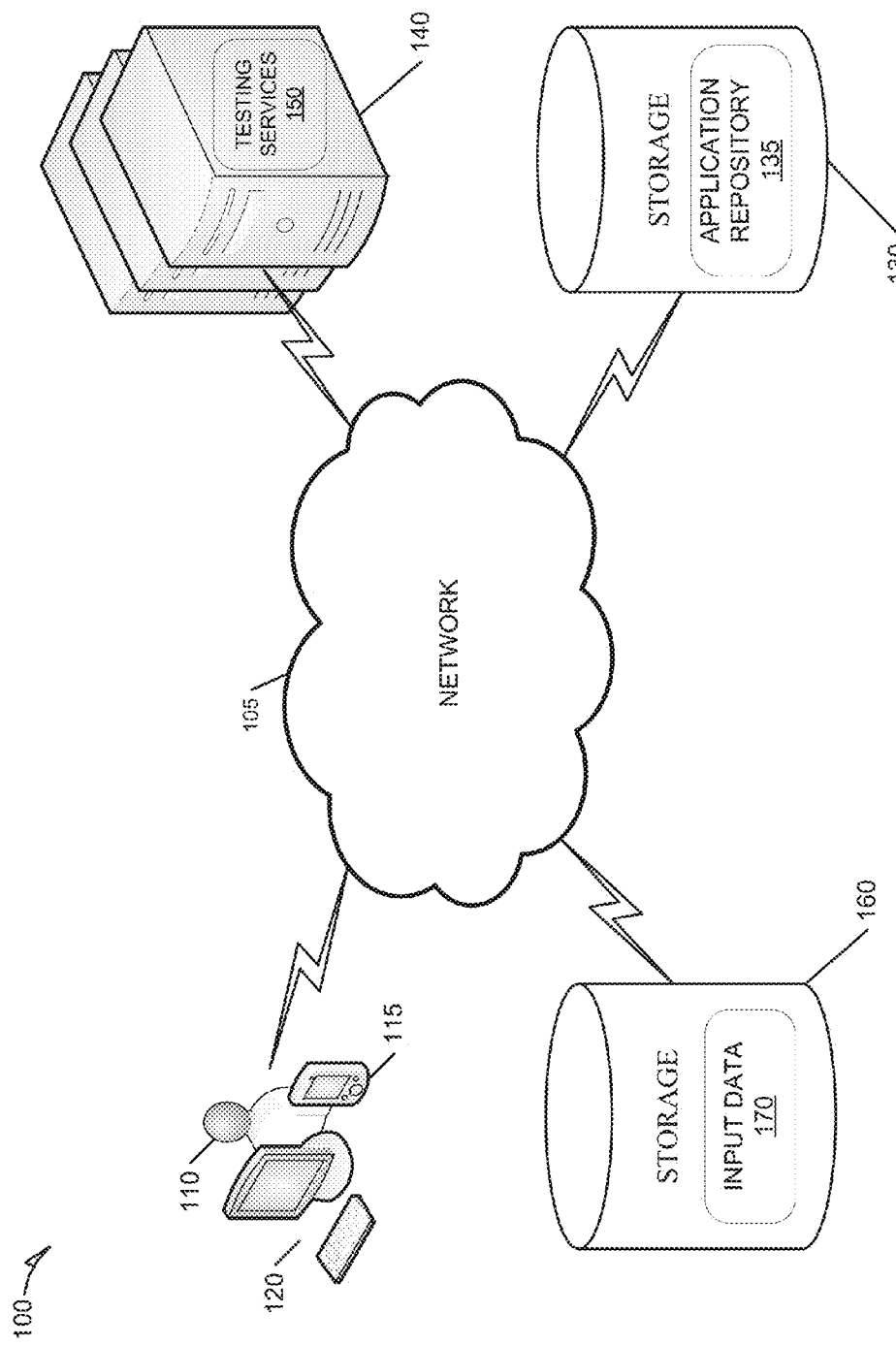
FIG. 1 is a use-case diagram showing a system, consistent with some embodiments, configured to perform a generic method for automated testing of software applications.

The cost of developing and maintaining test scripts can be great for several reasons. For example, simply creating a test to test one functionality, even using an automatic recoding tool, can often take much longer than it would take to simply run the tests manually. The test scripts must then be maintained, for example, in view of GUI changes which are frequent during the life cycle of a software application and can make a script that is not updated accordingly fail. When such a test script does indicate a failure, the root cause of the failure has to be examined to determine if an application bug or a test script bug is responsible, which takes time and effort. If it is a script bug, the test script will then have to be updated accordingly to correspond with the updated GUI of the software application elements in order to function properly. A test script that has not been properly maintained can fail if the locator fails to find a specific application element (e.g., an identifier). In fact, the same software application can sometimes display the same GUI slightly differently depending on a device being used to run the software application. For example, the same software application may run differently on mobile devices than it does on desktop devices, and this can cause the failure of a test script.

Test scripts can also have difficulty in dealing with dynamically created software such as a dynamically created web pages. Finding an element of dynamically created software (e.g., by its ID) can be challenging or even impossible, for example, because a random identifier is dynamically generated. Furthermore, the failure rate of test scripts can often be so great that test scripts are developed and only ever run once, if one application element being searched for by the script cannot be found then the test script fails and the whole test script is reported as having failed. Therefore, predefined scripts are always going to have some trouble when it comes to testing dynamically generated applications like a dynamically generated web page (e.g., for a newly generated software object such as a customer receipt web page after an online customer purchase transaction).

Embodiments described herein provide for a generic method for automated testing of software applications by testing the elements that are found on a page of an application GUI with a minimum of restrictions, e.g., a minimum number of elements that need to be found for the test script to operate without failure. In this way, the functions of a page of an application and its navigations (e.g., links to other pages of the application) can be tested, the testing can proceed to a next page of the application (e.g., using a navigation link of the current page or of a previous page if none of the navigation links of the current page are functioning properly). As noted above, a possible cause of failure of a test script is an inability to correctly identify (e.g., in the DOM of a page of an application GUI) an application element because its locator parameters and values have been incorrectly specified, e.g., because the parameters and values are old. In order to avoid this problem, embodiments described herein traverse the DOM of a page to collect only the application page elements that are necessary for the CRUD of an object and the application page elements needed for navigation from the page, e.g., navigation links. In other words instead of searching for very narrowly specified values of an attribute of a node in the DOM, the test scripts simply observe the elements of a page of an application GUI and work on the ones of interest (e.g., CRUD and navigation links) so that an unfound element is not a cause of failure for the test scripts.

Embodiments are described herein in the context of certain terms which will now be described. The DOM is an API for application "documents" (for example, the pages of an application GUI, e.g., web pages). The DOM defines the logical structure (e.g., via a hierarchy of nodes) of documents and the way the documents can be accessed and manipulated. DOM traversal refers to the use of a program to traverse the DOM (e.g., visit each node of a hierarchy of nodes) of an application page and collect application page elements according to a set of specified criteria. Embodiments are described herein in the context of data that is labeled and stored at each step of the testing process. For example, "current page" is the page currently tested, "current input nodes" refers to a collection of input nodes found by a DOM traversal of the current page, "current navigations" refers to a collection of links (or hypertext references (hrefs)) found by a DOM traversal of the current page and "current buttons" refers to a collection of action buttons (such as Save or Delete) found by a DOM traversal of the current page.

Furthermore, "visited pages" refers to a collection of all the pages of an application that have been already been visited (and therefore tested) by a single traversal of a set of application pages connected via navigations, and "previous page" refers to a page that was previously tested, e.g., before the actual current page. Upon navigating from the current page of the application being tested to the next page of the application, the "current input nodes" collection is renamed "previous input nodes," the "current navigations" collection is renamed "previous navigations." and the "current buttons" collection is renamed "previous buttons."

A "page input type" refers to the input type of a page that is used to create, read, update, or delete an object of the application. The input type of a page can be determined by looking at an input type application element. For example, if a required field is blank, then the page input type is "create", if a required field is not blank, then the page input type is "update" or "delete" and if all input fields are not editable, then the page input type is "read." In other words a page input type corresponds to the input type of a CRUD page of an application object.

A "page navigation testing" of a current page loops through the current navigations collection and for each navigation item (e.g., link), a forward navigation is performed and then immediately a return navigation to the current page is performed. For example, assume our current page is a display page (e.g., page input type is "read"), and this display page has two possible navigations: a) to an update page and b) to a delete page. A generic test script can first test the navigation to the update page and back to the display page and then to the delete page and back to the display page so that all page navigations have been tested.

Input data refers to data that is used to populate the input fields (e.g., of the application GUI) of the input nodes (e.g., of the DOM) in the current input nodes collection. The input data might be texts, numbers, or dates. For example, the input data may comprise text limited to strings, numbers limited to integer or floating point representations, and dates limited to a specific format for dates. If data have to or can be provided through a input field helper such as List or Select, then the default element of the List or Select is used or if there is no default element, then the first element of the List or Select will be used. If no helper is available for an input field, then a "seeded data value" is used. A "seeded data value" is an initial random value assigned to an input field, for example, the seeded data value can be the value of a system time stamp duly transformed and formatted to correspond to the data type and the format of the input field. For example if the time stamp is 2015-02-02:14:00:00, a seeded value of type string could be 2015-02-20, an integer value could be 2015, a floating point value could be 2015.00, a date value could be formatted as Feb. 20 2015 or 02/20/205 and a time value may be formatted as 1:00 PM or 13:00 depending on the time stamp format of the application being tested.

In order to keep the testing method as generic as possible, DDT is limited to a minimum, such as a login name or password needed to test an application. Any other data for input into an input field, if not available from a helper List or Select, will extracted from a system time stamp duly transformed and formatted, i.e. a "seeded data value." In the case of a failure of the test script with such a seeded data value, repetitive populating attempts may be performed for each of the input nodes for which there was an associated failure of a test script. If an input is rejected, multiple repetitive attempts at repopulating the input field are performed using looping and try-catch methods. Repetitive attempts minimize the wrongful reporting of fails due to bad data, inappropriate data entry, or inappropriate data format. In the case where all (e.g., a specified number or a specified number for each type of input field so that fields that are necessary may be tried more often) of the attempts to re-populate an input field fail, then the failure is logged and the test script is continued (e.g., continue testing current page or visit next page).

Embodiments described herein provide for accessing application data (e.g., application code) from an application repository. The application data may be associated with an application comprising pages and navigations between the pages. The accessed application data (e.g., html code) is then parsed into a DOM for each page of the application. For each page of the application, it is determined if the page creates, updates, or deletes an object of the application based on the DOM for the page. If the page does not create, update, or delete an object of the application, the DOM for the page is traversed to collect navigation links to another page of the application. If the page creates, updates, or deletes an object of the application, the DOM for the page is traversed to collect input nodes and any data associated with an input field of the input nodes, buttons for creating, updating, or deleting an object of the application; and navigation links to another page of the application.

Embodiments described herein provide for testing an application by visiting each page of the application, starting with a first page of the application, and for each page of the application that has not been previously visited (and therefore tested): performing a navigation test of each of the collected navigation links of the page with one forward and one backward navigation of the link: performing a function test of each collected button of the page for creating, updating, or deleting an object of the application by using the button to create, update, or delete an object and evaluating the results based on specified rules; recording any test results (e.g., success or failure); and following a navigation link of the page (or of a previously visited page if no further working links are available on the page) to a next page of the application.

FIG. 1 is a use-case diagram showing a system 100, consistent with some embodiments, configured to generate a complementary application for a user-accessed application.

System 100 includes a network 105 that can be any medium used to provide communication links between various devices (e.g., storage) and computers connected together within the system 100. Network 105 may include connections, such as wired, wireless communication links, fiber optic cables, or the like. In the depicted example, network 105 may include the Internet. Of course, network 105 may also be implemented as a number of different types of networks, such as for example, an intranet, a local area network (LAN), or a wide area network (WAN). Multiple servers 140 hosting testing services 150 are connected to network 105 along with one or more storages, such as storages 130 with application repository 135 and storage 160 with input data 170. In addition, client devices 115 and 120 of user 110 are also connected to network 105. Client device 120 may be, for example, a personal computer (PC) or a network computer. Client device 115 may be, for example, a mobile computer, a smart phone, a personal digital assistant (PDA), or other such mobile device. Testing services 150 of system 100 can be used for generic automated testing of applications (e.g., from application repository 135) by user 110.

System 100 may be used for implementing a client-server environment in which described embodiments may be implemented. A client-server environment enables software applications and data to be distributed across a network such that an application functions by using the interactivity between a client data processing system and a server data processing system. In this regard, an application being developed or used on client device 120 could make use of a server-side component (e.g., testing services 150) in one or more of servers 140 to test the application.

The user 110 can use client device 120 (or 115) to initiate tests of an application (e.g., accessed from application repository 135) using at least one of testing services 150 hosted by servers 140. The accessed application data is associated with an application comprising pages (e.g., GUI pages) and navigations between the pages. A testing service 150 may parse the application data into a DOM for each page of the application in order to represent and interact with objects of the application via test scripts. The testing service 150 can then, for each page of the application, determine if the page interacts with objects of the application (e.g., creating, updating, or deleting an object) based on the DOM that has been generated for the page. For example, a DOM with no action buttons or input nodes (e.g., only navigation links to other pages) would indicate a page that does not interact with any objects of the application.

The testing service 150 can then traverse the DOM of each page of the application and collect relevant testing data for each page of the application (e.g., to test the page navigations and/or page functionality) based on the input type of the page being tested, e.g., whether and how the page interacts with objects of the application. For example, based on the page not creating, updating, or deleting an object of the application, the DOM for the page may be traversed to collect only navigation links to another page of the application. Alternatively, if the page creates, updates, or deletes an object of the application, the DOM for the page may be traversed by testing service 150 to collect input nodes and any data associated with an input field of the input nodes (e.g., field input helpers such as List and Select), buttons for creating, updating, or deleting an object of the application, and navigation links to another page of the application.

Testing service 150 may employ test scripts to test each page of the application for which the DOM is traversed to collect the necessary testing data (e.g., input nodes, buttons, and navigations) for the page. The testing by testing service 150 involves visiting each page of the application (e.g., test may be executed on a client device 120 or a server 140) by starting with a first page of the application (e.g., main menu of GUI) and for each page of the application that has not been previously visited (and therefore tested): performing a navigation test of each of the collected navigation links of the page with one forward and one backward navigation of the link (e.g., this test may be performed on any type of application page that is linked to another application page), performing a function test of each of the collected buttons of the page for creating, updating, or deleting an object of the application (e.g., this test may be performed on any type of application page that interacts with an object of the application) by using the button to create, update, or delete an object and evaluating the results based on specified rules (e.g., was the result the expected result); recording any test results (e.g., success or failure); and following a navigation link of the page or of a previously visited page (e.g., if no further working links are available on the page) to a next page of the application.

The application data accessed from application repository 135 may correspond to an HTML based web application and the pages of the application correspond to web pages. Furthermore, the DOM generated by parsing the application data corresponding to a page of the application may define a DOM tree comprising a hierarchy of nodes (e.g., input nodes), and traversing the DOM for a page of the application will therefore include traversing the hierarchy of nodes of the DOM tree.

The testing service 150 may use a test script that tests the navigations for a page by: forwardly navigating each of the collected navigation links of the page to another page of the application and displaying (e.g., on a display of client device 120) an indication of the success or failure of the forward navigation of each of the collected navigation links; backwardly navigating each of the collected navigation links from the other page of the application back to the page of the application; and displaying of an indication (e.g., on a display of client device 115) of the success or failure of the backward navigation of each of the collected navigation links.

The testing service 150 may use a test script that tests the create or update functions for a page by, for each of the collected input nodes of the page: populating the input field of the input node with data from the associated data of the input field (e.g., a default or first selection from a helper List or Select); or populating the input field of the input node with seeded data if no associated data is available for the input field. The seeded data may be randomly generated (e.g., based on a system time stamp as explained above), or if necessary input data 170 from storage 160 (e.g., separate from testing services 150) may be accessed when it is absolutely needed for a test (e.g., user password). The test of the create or update functions for a page continues by, for each of the collected buttons of the page: creating or updating an object of the application: following a new dynamically generated navigation link of the page to a new dynamically generated page of the application for the created or updated object: performing creation-update tests on the content of the new page for the created or updated object based on comparing the content of the new page for the created or updated object to the associated data or seeded data used to populate the page (e.g., created or updated object should have input fields filled with data that corresponds to the associated data or seeded data used to populate the page): and displaying an indication of the success or failure of each of the creation-update tests (e.g., on a display of client device 120).

The testing service 150 may use a test script that tests the delete functions for a page (e.g., the new dynamically generated page of the application for the created or updated object) by: using each of the collected buttons of the page to delete an object of the application (e.g., the created or updated object), following a new dynamically created navigation link to a new dynamically created page of the application for the deleted object, performing deletion tests on the content of the new page for the deleted object based on comparing the content to data associated with the created or updated object (e.g., there should be no more data associated with the created or updated object in the content of the new page): and displaying an indication of the success or failure of each deletion test (e.g., on display of client device 120). In this way the system is not clogged with new application objects generated solely for the purpose testing since the newly created objects are then deleted to test the deletion functionality of the application page associated with a created or updated object of a test.

Furthermore, the testing service 150 may continue to test the create or update functions for a page even after several attempts have indicated a failure in order to ensure that the test script has not failed simply because some of the data used to populate the input nodes was only slightly off or simply improperly formatted. In order to do this, the testing service 150 continues to test the create or update functions for a page by responding to at least one of the creation-update tests failing by, for each of the collected input nodes of the page associated with one of the at least one failed creation-update tests: repopulating the input field of the input node with different data from the set of associated data of the input field (e.g., different from the associated data used to populate the input field in the test that failed) or repopulating the input field of the input node with different seeded data (e.g., different from the seeded data used to populate the input field in the test that failed).

The testing service 150 may then, for each of the buttons of the page associated with one of the at least one failed creation-update tests: re-create or re-update an object of the application associated with one of the at least one failed create-update tests (e.g., using the same deletion button used for the failed test); follow a newly generated navigation link of the page to a newly generated page of the application for the re-created or re-updated object: re-perform the at least one failed creation-update test on the content of the new page for the re-created or re-updated object based on comparing the content of the new page for the re-created or re-updated object to the repopulated data or repopulated seeded data from the page (e.g., new or updated object should have input fields filled with data that corresponds to the associated data or seeded data used to repopulate the page); and display an indication of the success or failure of each of the creation-update tests (e.g., on a display of client device 120). The process of re-testing the functions of a page including input fields may continue for a pre-specified number of attempts and according to multiple different looping algorithms prior to the creation-update test being indicated as a failure.

Figure 2:
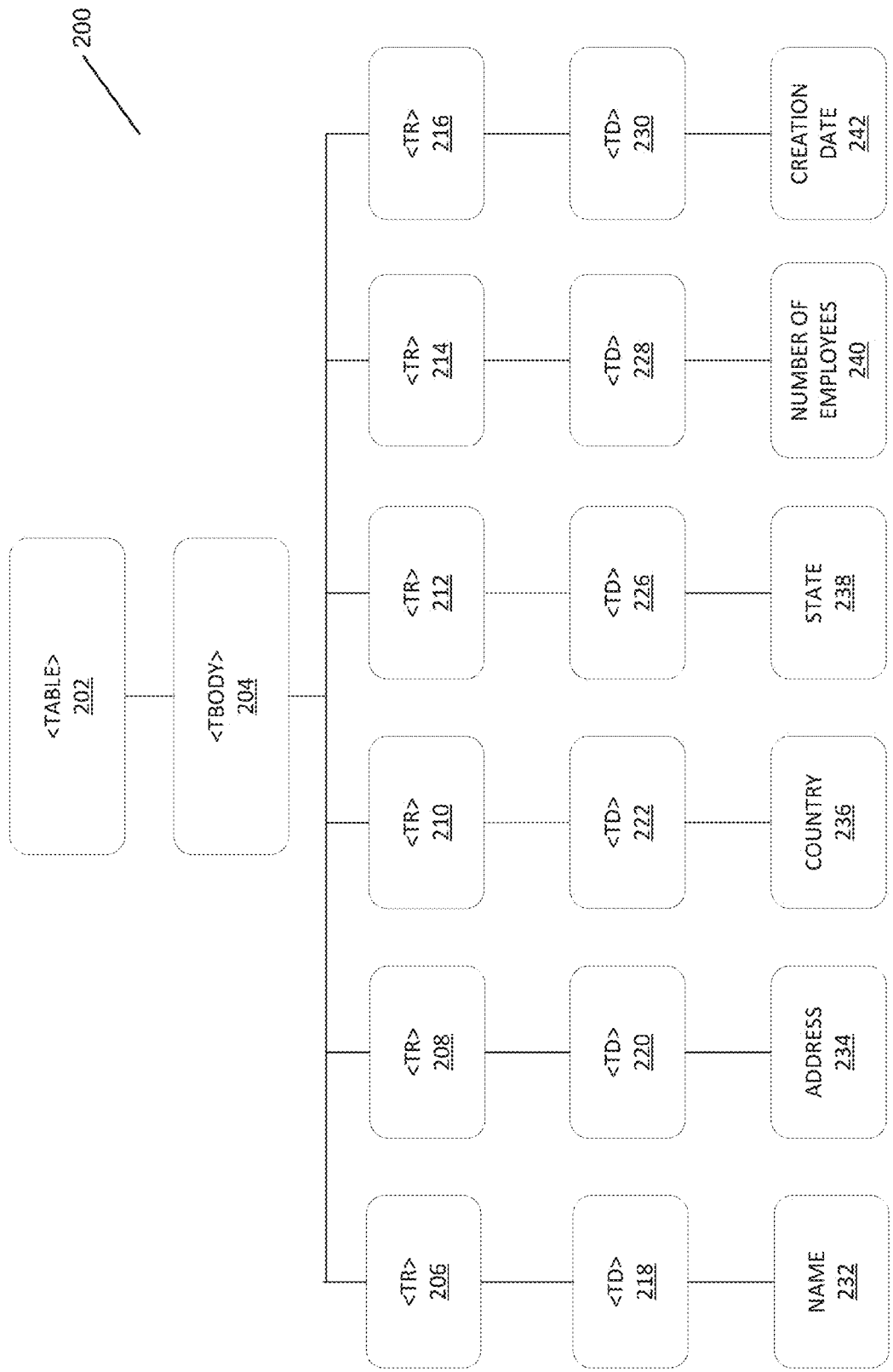
FIG. 2 is a diagram illustrating a graphical representation of a DOM of an example table of a page of an application interface.

FIG. 2 is a diagram illustrating a graphical representation of a DOM 200 of an example table of a page of an application interface.

A page of an application GUI (e.g., a web page) that is being tested may include a table (e.g., for a new corporate customer account), for example, an HTML table, defined as:

<TABLE>
<TBODY>
<TR>
<TD>NAME</TD>
</TR>
<TD>ADDRESS</TD>
</TR>
<TD>STATE</TD>
</TR>
<TD>COUNTRY</TD>
<TD>NUMBER OF EMPLYEES</TD>
</TR>
<TD>CREATION DATE</TD>
</TR>
</TBODY>
</TABLE>

The application data (e.g., HTML data) corresponding to the table can be parsed into a DOM 200 since the table (and most documents) has a logical structure which is very similar to a branching tree or several branching tress. In parsing the application data for the table to generate DOM 200 there are specified parameters to be followed, for example, each application page includes at most one page type node and one root element node, and may also include comments or processing instructions. The root element serves as the root of the element tree for the document. However, parsing application data into a DOM does not necessarily mean that application pages must be implemented as branching tree(s). The DOM 200 does not specify how the relationships among objects be implemented since a DOM is a logical model that may be implemented according to several different methods that may be convenient. There may be also be some variations based on the parser being used to generate a DOM. For example, some parsers may discard whitespaces in elements.

In the present example, application data for a table (e.g., shown above), includes a definition as a table via the <table> tag. The table is divided into table rows with the <tr> tag, and the table rows are divided into table data with the <td> tag. Therefore, the generated DOM 200 includes a: root node 202 "<TABLE>," node 204 "<TBODY>," nodes 206, 208, 210, 212, 214 and 216 "<TR>" (e.g., to define table rows), nodes 218, 220, 222, 224, 226, 228 and 230 "<TD>" (e.g., to act as containers for data), and element nodes: 232 "NAME," 234 "ADDRESS," 236 "COUNTRY," 238 "STATE," 240 "NUMBER OF EMPLOYEES," and 242 "CREATION DATE" representing the input nodes with parameters for data arguments that may be received into the table.

Figure 3:
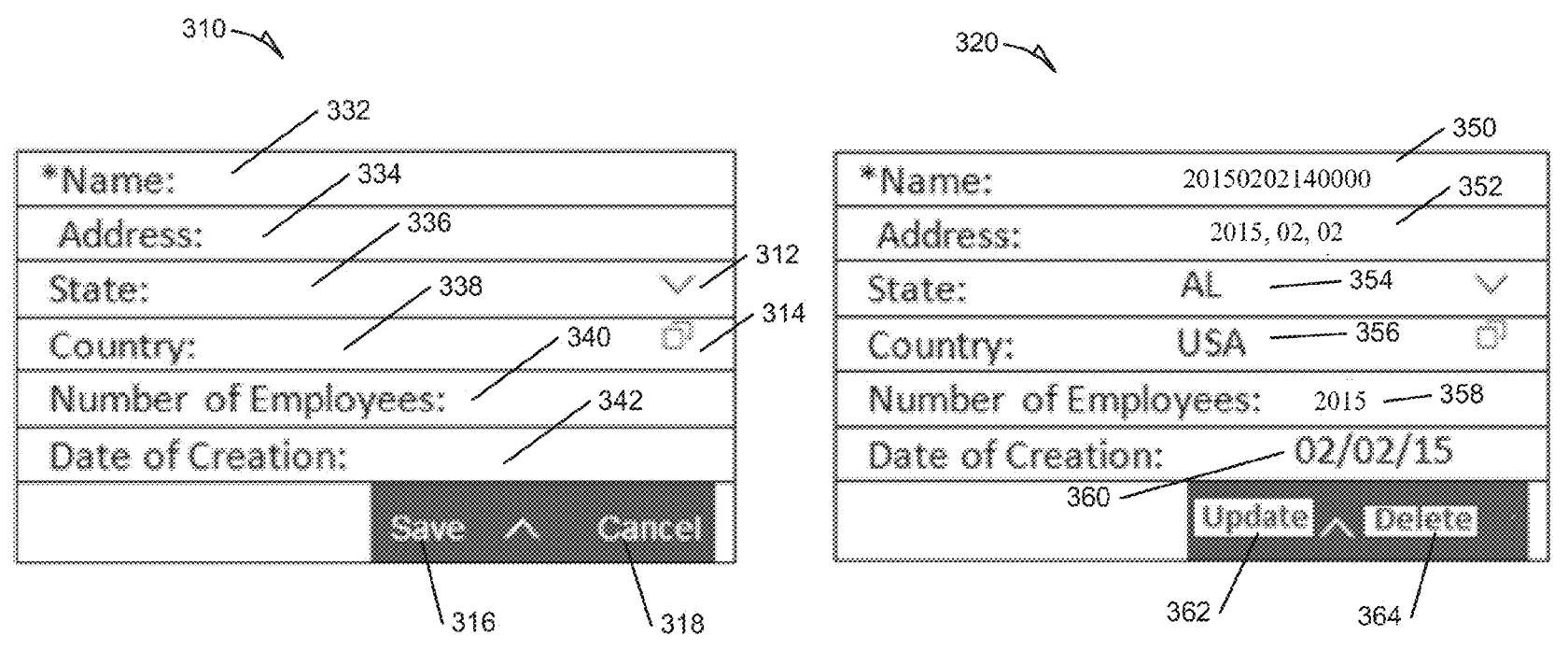

FIG. 3 is an illustration of example pages 310 and 320 of an application GUI for creating a new customer account object for the application.

The example pages 310 and 320 of an application GUI for creating-updating-deleting a new customer account object include input fields corresponding to the input nodes (parameters) of the DOM 200 of FIG. 2. Page 310 is a create type page and page 320 is a dynamically generated application page (e.g., generated based on using the save button 316) for a new application object (e.g., customer account) with action buttons for updating the object and for deleting the object. The example page 310 shows an application GUI for a simple customer account creation web page. Data have to be entered into several input fields: Name 332 and Address 334 input fields accept free text arguments (e.g., no helpers); State 336 and Country 338 input fields have helpers List 312 and Select 314, respectively, to choose arguments from; Number of Employees 340 input field accepts a number argument; and Date of Creation 342 input field accepts a date (e.g., formatted) as an argument.

A locator query traversing the DOM generated by parsing the application data (e.g., HTML code) corresponding to example page 310 (e.g., DOM 200 of FIG. 2) can collect the nodes with tag name input (e.g., input nodes corresponding to input fields 332, 334, 336, 338, 340 and 342 of page 310), their associated helpers if any (e.g., associated data of input nodes such as data for List 312 and Select 314), the "save" button 316 (e.g., "create" action button) and the "cancel" button 318 (e.g., navigation link to previous page) for further manipulation. Once the nodes of page 310 are traversed, the input fields (e.g., fields 332, 334, 336, 338, 340 and 342) of page 310 are populated with data either from input field helpers (e.g., List 312 and Select 314) or with seeded values (e.g., formatted time stamp); if an attempt fails (e.g., test script failure to create a proper customer account), then other attempts to test the create functionality of page 310 will be attempted (e.g., a specified number of times for each type of input field) with data argument variations in order to confidently assess whether the test script is failing due to its own bugs or logic or because the tested application page 310 is not functioning properly. In the case where a maximum number of unsuccessful attempts to populate an input field have been performed, failure is logged and the test script is continued without indication of a total failure of the test script.

In the present example, page 320 of the application shows the results of one attempt to populate the input fields of page 310. As seen in page 320 (for clarity the elements from page 310 (e.g., input field parameters) in page 320 are not numbered), the Name 332 input field has been populated with the argument 350 "20150202140000". e.g., seeded string value from timestamp. This is because the name field is mandatory (e.g., as indicated by the *) and since duplicated names nay cause errors a full time stamp up to the second or millisecond can be used, such as 20150202140000, in order to avoid this possibility. The Address 334 input field has been populated with the argument 352 "2015, 02, 20" (e.g., seeded string values from timestamp but could be single string value 2015), the State 336 input field has been populated with the argument 354 "AL" (e.g., first element in helper LIST 312), the Country 338 input field has been populated with the argument 356 "USA" (e.g., default element in helper Select 314), the Number of Employees 340 input field has been populated with the argument 358 "2015" (e.g., seeded integer value from timestamp) and the Date of Creation 342 input field has been populated by the argument 360 "02/02/15" (e.g., formatted date based on system time stamp).

The create functionality of page 310 is tested by using the save button 316 to create a new customer account and navigate to the newly created application object (e.g., page 320 for the new customer account). The new page 320 is analyzed to test the create functionality of page 310. The values in the input fields (e.g., fields 332, 334, 336, 338, 340 and 342) of new page 320 are compared to the values used to populate the input fields of page 310 in order to validate the create functionality (e.g., functionality of save button 316) of application page 310. Furthermore, the functionality of page 320 includes two possible actions: via "update" button 362 (e.g., update functionality) and via "delete" button 364 (e.g., delete functionality) that will be tested as explained above with respect to the update and delete functionalities of a page. A generic test script also tests the navigation back to create page 310 from update-delete page 320 so that all of the navigations between pages 310 and 320 are tested. Furthermore, in regard to the navigation tests, as noted above the "cancel" button 318 comprises a navigation link (e.g., to the previously visited page of the application) that may be tested via one forward and one backward navigation.

Figure 4:
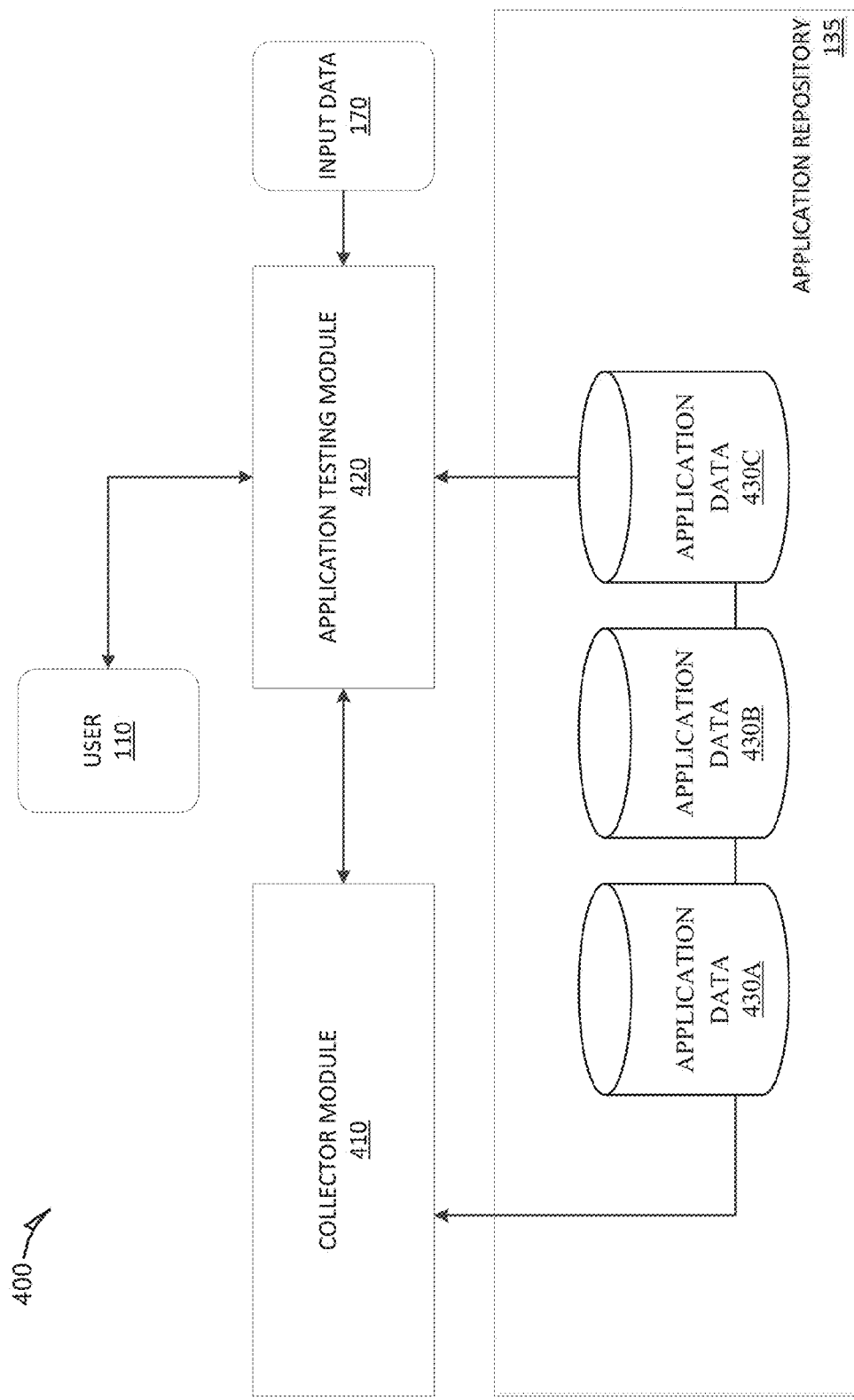
FIG. 4 is a block diagram of a data flow of a system, consistent with some embodiments, configured to perform a generic method for automated testing of software applications.

FIG. 4 is a block diagram of a data flow of a system 400, consistent with some embodiments, configured to perform a generic method for automated testing of software applications. The elements in FIG. 4 include elements from FIG. 1, which elements are labeled with the same identifiers.

The user 110 (e.g., using client device 120 or 115) may initiate tests of an application for which application data 430A has been accessed from application repository 135 via an application testing module 420 (e.g., hosted by servers 140). The accessed application data 430A is associated with an application comprising pages (e.g., GUI pages) and navigations between the pages (e.g., application data 430B and 430C correspond to other such applications). Application testing module 420 may parse the application data 430A into a DOM for each page of the application in order to represent and interact with objects of the application via test scripts. The application testing module 420 can then, for each page of the application, determine if the page interacts with objects of the application (e.g., creating, updating, or deleting an object) based on the DOM that has been generated for the page.

A collector module 410 can then traverse the DOM of each page of the application and collect relevant testing data for each page of the application (e.g., to test the page navigations and/or functionality) based on the type of page being tested (e.g., whether and how the page interacts with objects of the application). For example, based on the page not creating, updating, or deleting an object of the application, the DOM for the page may be traversed to collect only navigation links to another page of the application. Alternatively, if the page creates, update, or deletes an object of the application, the DOM for the page may be traversed by collector module 410 to collect input nodes and any data associated with an input field of the input nodes (e.g., field input helpers such as List and Select), buttons for creating, updating, or deleting an object of the application, and navigation links to another page of the application.

Application testing module 420 may employ test scripts to test each page of the application for which the DOM is traversed to collect the necessary testing data (e.g., input nodes, buttons, and navigations) for the page. The testing by application testing module 420 involves visiting each page of the application (e.g., test may be executed on a client device 120 or a server 140, not shown in FIG. 4) by starting with a first page of the application (e.g., main menu of web page) and for each page of the application that has not been previously visited (and therefore tested): performing a navigation test of each of the collected navigation links of the page with one forward and one backward navigation of the link (e.g., this test may be performed on any type of application page that is linked to another application page); performing a function test of each collected button of the page for creating, updating, or deleting an object of the application (e.g., this test may be performed on any type of application page that interacts with an object of the application) by using the button to create, update, or delete an object and evaluating the results based on specified rules (e.g., was the result the expected result); recording any test failures; and following a navigation link of the page (or of a previously visited page) to a next page of the application.

The application data 430A accessed from application repository 135 may correspond to an HTML based web application and the pages of the application may correspond to web pages. Furthermore, the DOM generated by application testing module 420 parsing the application data 430A corresponding to a page of the application may define a DOM tree comprising a hierarchy of nodes (e.g., input nodes), and traversing the DOM for a page of the application by collector module 410 will therefore include traversing the hierarchy of nodes of the generated DOM tree.

Figure 5:
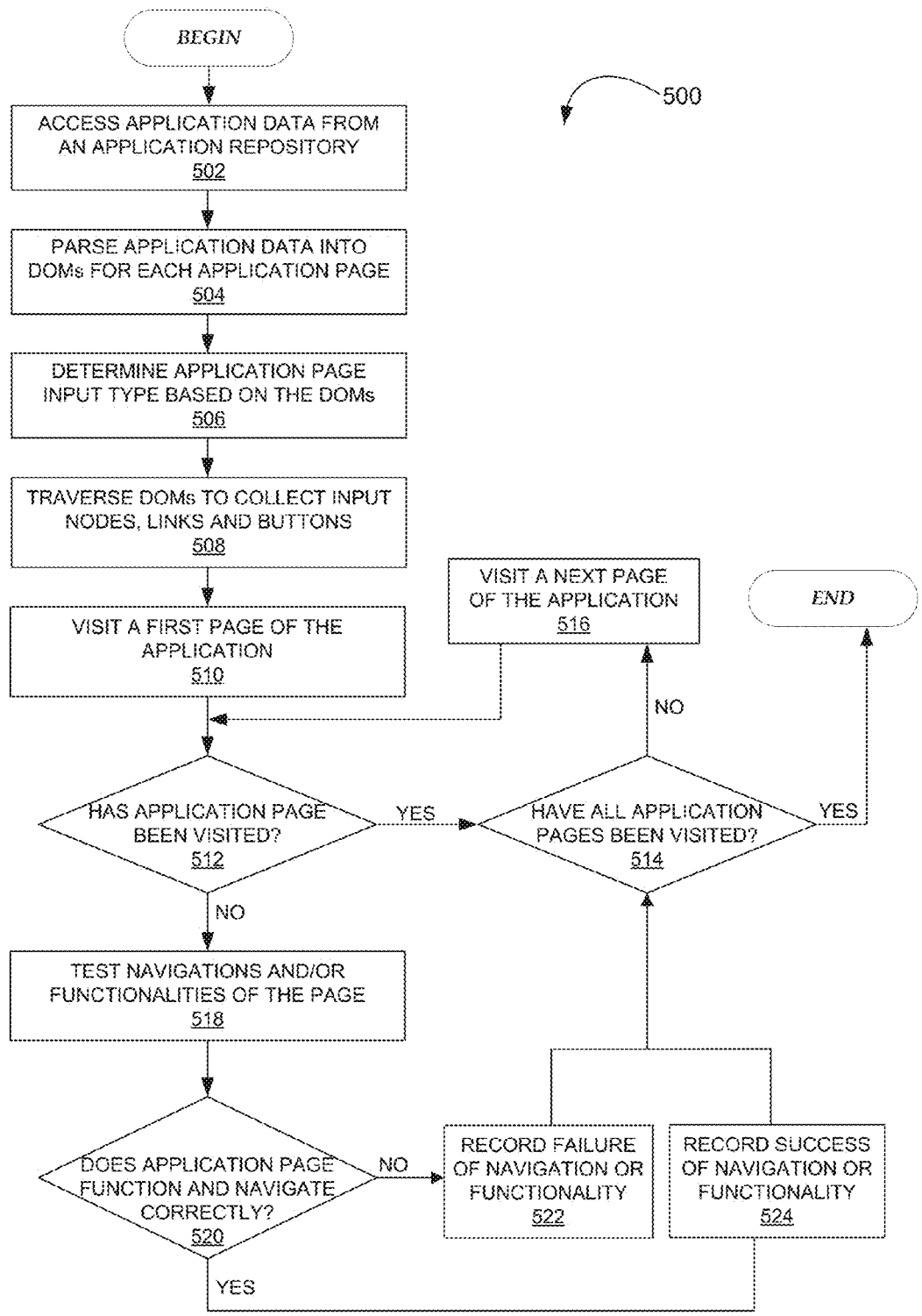
FIG. 5 is a flow diagram of a method, consistent with some embodiments, for performing a generic method for automated testing of software applications.

FIG. 5 is a flow diagram of a method 500, consistent with some embodiments, for performing a generic method for automated testing of software applications. The elements in FIG. 5 are described in the context of elements from FIG. 1 and FIG. 4, which elements are described with the same identifiers.

At operation 502, the user 110 (e.g., using client device 120 or 115) may initiate tests of an application for which application data 430A has been accessed from application repository 135 via an application testing module 420 (e.g., hosted by servers 140). The accessed application data 430A is associated with an application comprising pages (e.g., GUI pages) and navigations between the pages. At operation 504, the application testing module 420 may parse the application data 430A into a DOM for each page of the application in order to represent and interact with objects of the application via test scripts. At operation 506, the application testing module 420 can then, for each page of the application, determine the page input type by determining if the page interacts with objects of the application (e.g., creating, updating or deleting an object) based on the DOM that has been generated for the page.

At operation 508, the collector module 410 can then traverse the DOM of each page of the application and collect relevant testing data for each page of the application (e.g., to test the page navigations and/or functionality) based on the type of page being tested (e.g., whether and how the page interacts with objects of the application). For example, based on the page not creating, updating, or deleting an object of the application, the DOM for the page may be traversed to collect only navigation links to another page of the application. Alternatively, if the page creates, updates, or deletes an object of the application, the DOM for the page may be traversed by collector module 410 to collect input nodes and any data associated with an input field of the input nodes (e.g., field input helpers such as List and Select), buttons for creating, updating, or deleting an object of the application, and navigation links to another page of the application.

At operation 510, the application testing module 420 may employ test scripts to test each page of the application for which the DOM is traversed to collect the necessary testing data (e.g., input nodes, buttons, and navigations) for the page by visiting a first page of the application (e.g. main menu) to begin the testing. At operation 512, for each page of the application (e.g., starting with the first page) it is first determined whether the page has been previously visited (and therefore tested) during this test run. If it is determined, at operation 512, that the page has already been visited, then, at operation 514, the application testing module 420 proceeds to determine if all of the application pages (e.g., for which DOMs have been generated) have already been visited. If all application pages have already been visited then the method 500 ends. If all application pages have not already been visited then, at operation 516, the application testing module 420 proceeds to visit a next page of the application via a navigation link of the current page or via a navigation link of a page that has previously been visited.

If it is determined, at operation 512, that the page has not already been visited, then, at operation 518, the application testing module 420 proceeds to perform a navigation test of each of the collected navigation links of the page with one forward and one backward navigation of the link (e.g., this test may be performed on any type of application page that is linked to another application page) and to perform a function test of each collected button of the page for creating, updating, or deleting an object of the application (e.g., this test may be performed on any type of application page that interacts with an object of the application) by using the button to create, update, or delete an object and evaluating the results based on specified rules (e.g., was the result the expected result). At operation 520 it is determined, based on the tests at operation 518 (which are described in more detail below with respect to FIGS. 6 and 7), for each page: whether the functionalities and navigations of the page are functioning properly. At operation 522, for each failed navigation or functionality test of a page: the failed test results are recorded and the method proceeds to operation 514 in order to determine if there are any application pages that have not yet been visited for testing. At operation 522, for each successful navigation or functionality test of a page: the successful test results are recorded and the method proceeds to operation in order to determine if there are any application pages that have not yet been visited for testing. As noted above, if all application pages have already been visited then the method 500 ends.

Figure 6:
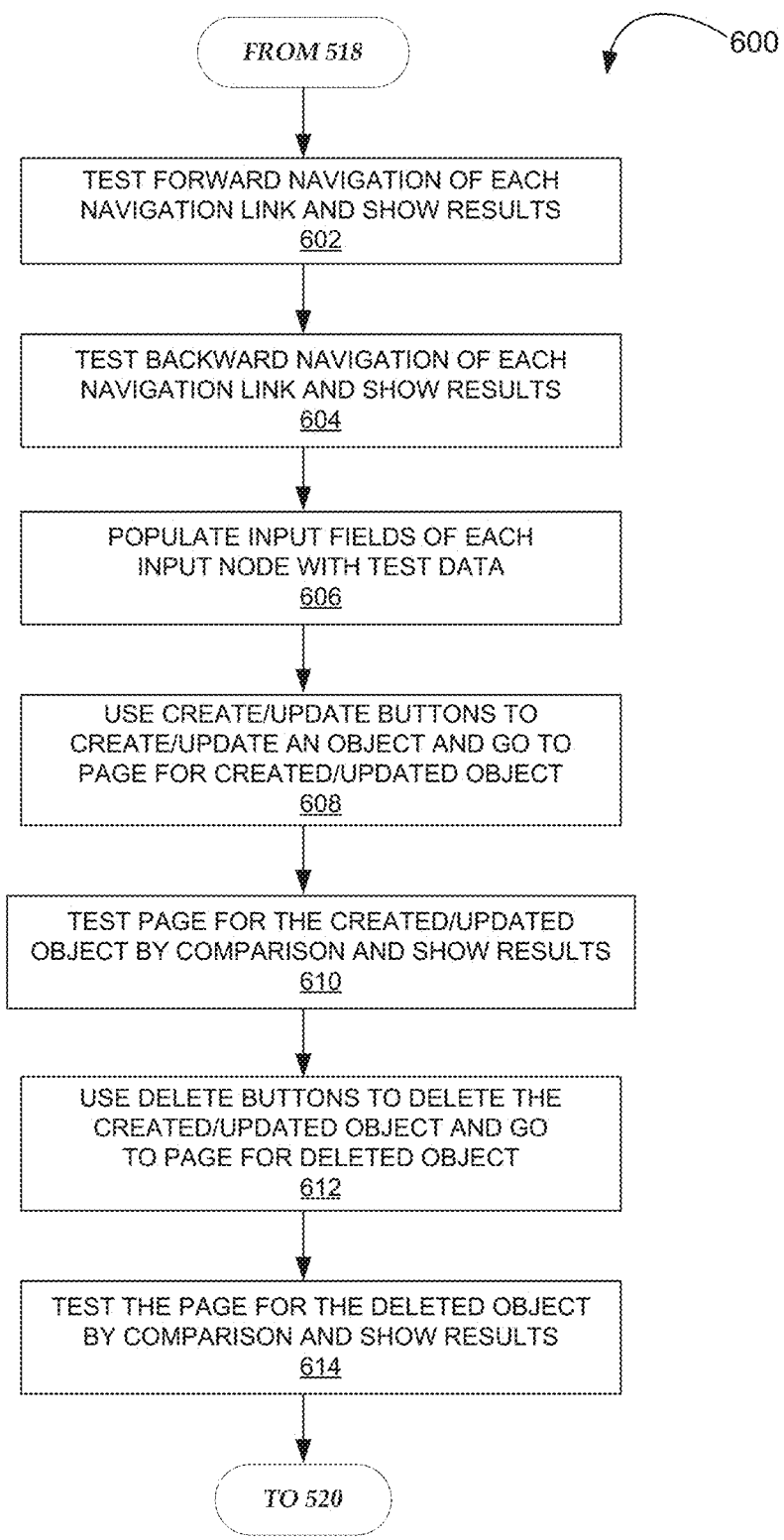
FIG. 6 is a flow diagram of a method, consistent with some embodiments, for performing a generic method for automated testing of software applications.

FIG. 6 is a flow diagram of a method 600, consistent with some embodiments, for performing a generic method for automated testing of software applications. The elements in FIG. 6 are described in the context of elements from FIG. 1 and FIG. 4, which elements are described with the same identifiers.

At operation 602 (which continues from operation 518 of method 500 of FIG. 5), the application testing module 420 may use a test script that tests the navigations for a page by forwardly navigating each of the collected navigation links of the page to another page of the application and displaying (e.g., on a display of client device 120) an indication of the success or failure of the forward navigation of each of the collected navigation links. At operation 604, the application testing module 420 may backwardly navigate each of the collected navigation links from the other page of the application back to the page and display an indication (e.g., on a display of client device 115) of the success or failure of the backward navigation of each of the collected navigation links.

At operation 606, the application testing module 420 may use a test script that tests the create or update functions for a page by, for each of the collected input nodes of the page, populating the input field of the input node with data from the associated data of the input field (e.g., a default or first selection from a helper List or Select) or populating the input field of the input node with seeded data if no associated data is available for the input field. The seeded data may be randomly generated (e.g., based on a system time stamp as explained above) or, if necessary, input data 170 from storage 160 (e.g., separate from testing services 150) may be accessed when it is absolutely needed for a test (e.g., a user password).

At operation 608, the application testing module 420 may test the create or update functions for a page by, for each of the collected buttons of the page, creating or updating an object of the application, and following a new, dynamically generated navigation link of the page to a new, dynamically generated page of the application for the created or updated object. At operation 610, the application testing module 420 may perform creation-update tests on the content of the new page for the created or updated object based on comparing the content of the new page for the created or updated object to the associated data or seeded data used to populate the page (e.g., page for new or updated object should have input fields filled with data that corresponds to the associated data or seeded data used to populate the page used to create the object) and display an indication of the success or failure of each of the creation-update tests (e.g., on a display of client device 120).

At operation 612, the application testing module 420 may use a test script that tests the delete functions for a page (e.g., the new page for the created or updated object) by using each of the collected buttons of the page to delete an object of the application and then following a new, dynamically created navigation link of the page to a new, dynamically created page of the application for the deleted object. At operation 614, the application testing module 420 may perform deletion tests on the content of the new page for the deleted object (e.g., are all fields blank) based on comparing the content to data associated with the created or updated object (e.g., there should be no more data associated with the deleted object in the content of the new page), and display an indication of the success or failure of the deletion tests (e.g., on a display of client device 120).

Figure 7:
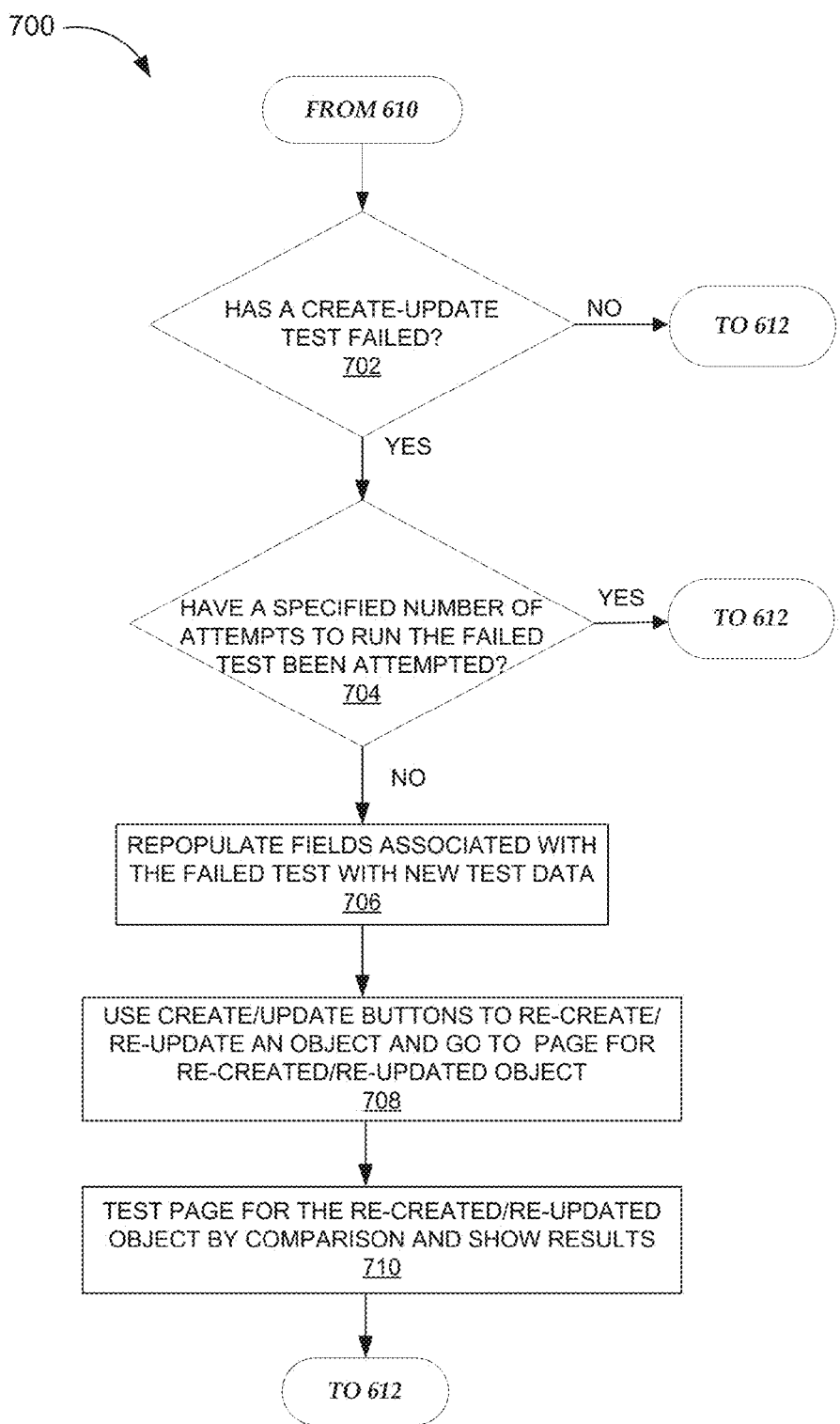
FIG. 7 is a flow diagram of a method, consistent with some embodiments, for performing a generic method for automated testing of software applications.

FIG. 7 is a flow diagram of a method 700, consistent with some embodiments, for performing a generic method for automated testing of software applications. The elements in FIG. 7 are described in the context of elements from FIG. 1 and FIG. 4, which elements are described with the same identifiers.

Method 700 continues from operation 610 of method 600 of FIG. 6, with the application testing module 420 continuing to test the create or update functions for a page even after several attempts have indicated a failure in order to ensure that the test script has not failed simply because some of the data used to populate the input nodes was only slightly off or improperly formatted. In order to do this, the application testing module 420, at operation 702, determines whether any create-update tests have failed (e.g., based on results from operation 610 of method 600 of FIG. 6) and if none have yet failed, the method continues to operation 612 of method 600 of FIG. 6. If there has been a failed creation-update test, at operation 704, the application testing module 420 determines if a pre-specified number of attempts have been made to run the failed test (e.g., specified number based on type of input field) and if they have already been attempted (e.g., using looping algorithms to try different test data and different formats for the test data), the method continues to operation 612 of method 600 of FIG. 6. If the pre-specified number of attempts have not yet occurred, then, at operation 706, the application testing module 420 responds to the failed creation-update test by, for each of the input nodes of the page associated with at least one failed creation-update test, repopulating the input field of the input node with different data from the set of associated data of the input field (e.g., different from the associated data used to populate the input field in the test that failed) or repopulating the input field of the input node with different seeded data (e.g., different from the seeded data used in the test that failed).

At operation 708, the application testing module 420 may, for each of the buttons of the page associated with one of the at least one failed creation-update tests, re-create or re-update an object of the application associated with one of the at least one failed create-update tests (e.g., using the same deletion button used for the failed test), following a newly generated navigation link of the page to a newly generated page of the application for the re-created or re-updated object. At operation 710, the application testing module 420 may re-perform the failed creation-update test on the content of the new page for the re-created or re-updated object based on comparing the content of the new page for the re-created or re-updated object to the repopulated data or repopulated seeded data from the page (e.g., new or updated object should have input fields filled with data that corresponds to the associated data or seeded data used to repopulate the page) and then the method continues to operation 612 of method 600 of FIG. 6. As explained above, the process of re-testing the functions of a page including input fields may continue for a pre-specified number of attempts and according to multiple different algorithms prior to the creation-update test being indicated as a failure.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein may, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or a server farm), while in other example embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., APIs).

Electronic Apparatus and System

Example embodiments can be implemented in digital electronic circuitry, or in computer hardware, firmware, software, or combinations of these. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware can be a design choice. Below are set out hardware (e.g., machine) and software architectures that can be deployed, in various example embodiments.

Machine Architecture and Machine-Readable Medium

Figure 8:
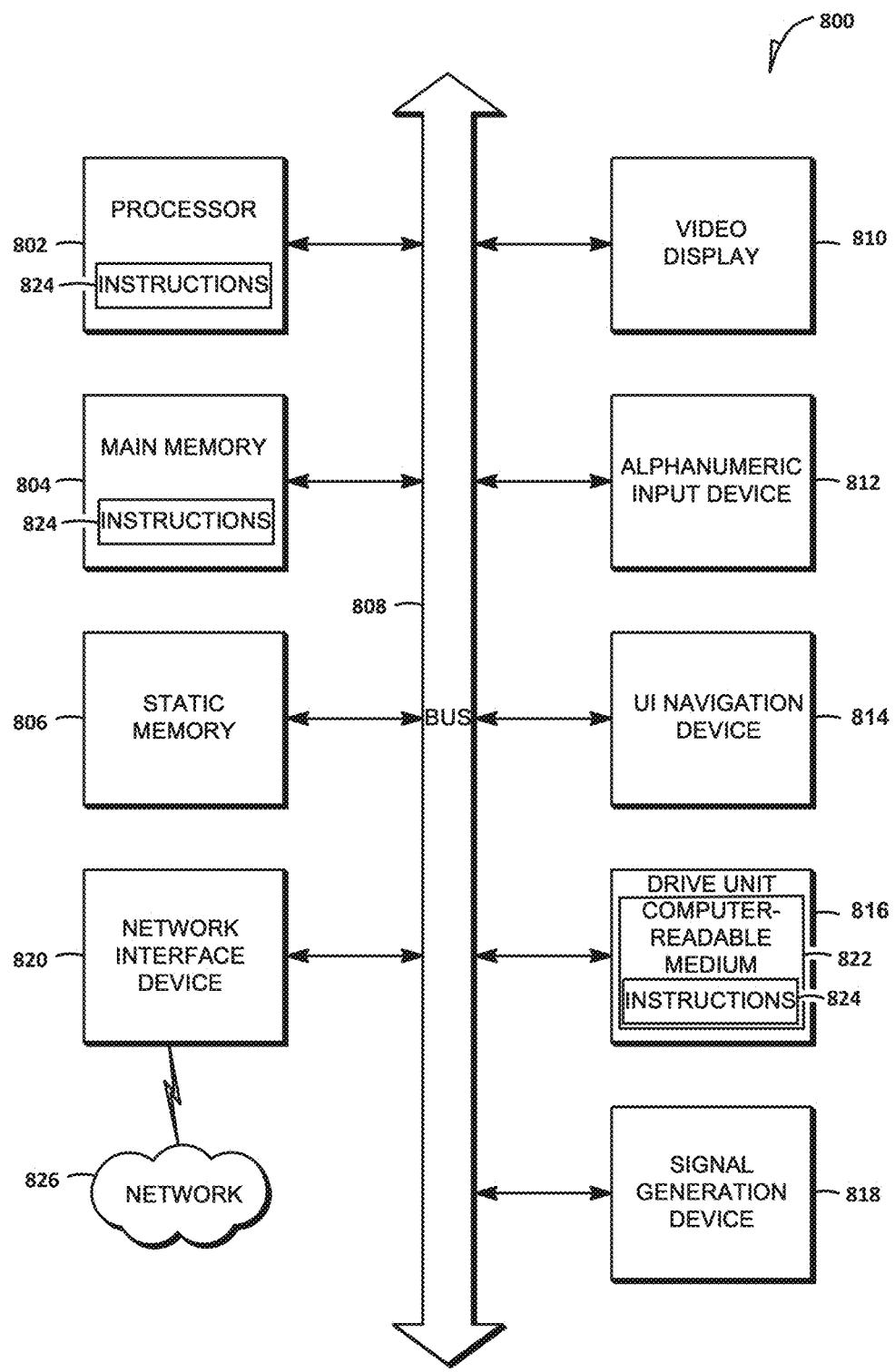
FIG. 8 is a diagrammatic representation of a machine, in the example form of a computer system, within which a set of instructions may be executed to cause the machine to perform the methodologies discussed herein.

FIG. 8 is a block diagram of a machine in the example form of a computer system 800 within which instructions 824 for causing the machine to perform any one or more of the methodologies discussed herein can be executed. In alternative embodiments, the machine can operate as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a PC, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 can further include a video display unit 810 (e.g., a liquid crystal display (LCD) or a cathode ray tube (CRT)). The computer system 800 can also include an alphanumeric input device 812 (e.g., a keyboard or a touch-sensitive display screen), a user interface (UI) navigation device 814 (e.g., a mouse), a drive unit 816, a signal generation device 818 (e.g., a speaker), and a network interface device 820.

Machine-Readable Medium

The disk drive unit 816 includes a computer-readable medium 822 on which is stored one or more sets of data structures and instructions 824 (e.g., software) embodying or utilized by any one or more of the methodologies or functions described herein. The instructions 824 can also reside, completely or at least partially, within the main memory 804 and/or within the processor 802 during execution thereof by the computer system 8(X), with the main memory 804 and the processor 802 also constituting machine-readable media.

While the computer-readable medium 822 is shown in an example embodiment to be a single medium, the term "machine-readable medium" can include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions (e.g., instructions 824) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks: magneto-optical disks: and other ROM disks.

Transmission Medium

The instructions 824 can further be transmitted or received over a communication network 826 using a transmission medium. The instructions 824 can be transmitted using the network interface device 820 and any one of a number of well-known transfer protocols (e.g., hypertext transfer protocol (HTTP)). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions (e.g., instructions 824) for execution by the machine, and includes digital or analog communications signals or other media to facilitate communication of software.

Example Mobile Device

Figure 9:
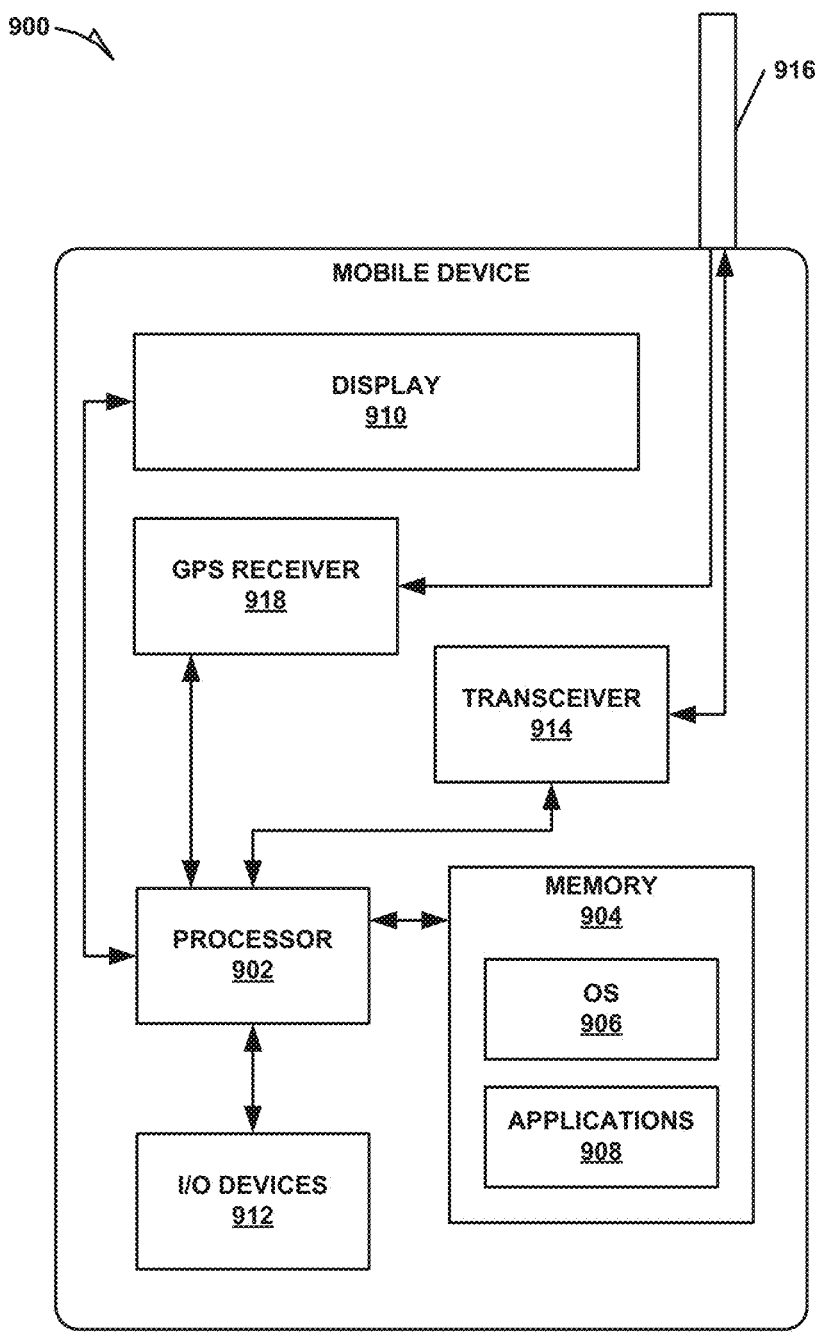
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or another type of memory, is typically accessible to the processor 902. The memory 904 may be adapted to store an operating system (OS) 906, as well as applications 908, such as a mobile location-enabled application that may provide location-based services (LBSs) to a user. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a Global Positioning System (GPS) receiver 918 may also make use of the antenna 916 to receive GPS signals.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents.

The invention claimed is:

1. A system comprising:
   at least one hardware processor;
   a data collector module implemented by the at least one processor and configured to:

access application data from an application repository, the application data associated with an application comprising pages and navigations between the pages;
parse the application data corresponding to a page of the application into a Document Object Model (DOM) for each page of the application, wherein the DOM defines a DOM tree comprising a hierarchy of nodes and traversal of the DOM for the page comprises traversing the hierarchy of nodes of the DOM tree;
for each page of the application:
determine if the page creates, updates, or deletes an object of the application based on the DOM for the page;
based on the page not creating, updating, or deleting an object of the application, traverse the DOM for the page to collect navigation links to another page of the application; and
based on the page creating, updating, or deleting an object of the application, traverse the DOM for the page to collect: input nodes and any data associated with an input field of the input nodes, buttons for creating, updating, or deleting an object of the application; and
navigation links to another page of the application; and
an application testing module implemented by the at least one processor and configured to visit each page of the application by starting with a first page of the application and, for each page of the application that has not been previously visited:
perform a navigation test of each of the collected navigation links of the page with one forward and one backward navigation of the link;
perform a function test of each of the collected buttons of the page for creating, updating, or deleting an object of the application by using the button to create, update, or delete an object and evaluating the results based on specified rules;
record a success or failure of each performed test; and
follow a navigation link of the page or of a previously visited page to a next page of the application.

2. The system of claim 1, wherein the application is an HTML based web application and the pages of the application correspond to web pages.

3. The system of claim 1, the application testing module further configured to perform the navigation test for each page by, for each of the collected navigation links of the page:
forwardly navigating the navigation link to another page of the application and displaying of an indication of a success or failure of the forward navigation of the navigation link; and
backwardly navigating the navigation link from the other page of the application back to the page and displaying an indication of a success or failure of the backward navigation of the navigation link.

4. The system of claim 1, the application testing module further configured to perform the function test for each page of the application that creates or updates an object by, for each of the collected input nodes of the page;
populating the input field of the input node with data from the associated data of the input field; or
populating the input field of the input node with seeded data if no associated data is available for the input field; and
for each of the collected buttons for creating or updating an object of the page:
creating or updating an object of the application;
following a new navigation link of the page to a new-page of the application for the created or updated object,
performing creation-update tests on a content of the new page for the created or updated object based on comparing the content of the new page for the created or updated object to the associated data or seeded data used to populate the page; and
displaying an indication of a success or failure of each of the creation-update tests.

5. The system of claim 4, the application testing module further configured to perform the function test for each page that deletes the created or updated object by, for each of the collected buttons for deleting a created or updated object of the page:
deleting the created or updated object of the application;
following a new navigation link of the page to a new page of the application for the deleted object;
preforming deletion tests on a content of the new page for the deleted object based on comparing the content to data associated with the deleted object of the page; and
displaying an indication of a success or failure of each of the deletion tests.

6. The system of claim 4, the application testing module being further configured to, based on at least one of the creation-update tests failing, for each of the collected input nodes of the page associated with one of the at least one failed creation-update tests:
repopulating the input field of the input node with different data from the associated data of the input field; or
repopulating the input field of the input node with different seeded data; and
for each of the collected buttons of the page associated with one of the at least one failed creation-update tests:
re-creating or re-updating an object of the application associated with one of the at least one failed create-update tests;
following a new navigation link of the page to a new page of the application for the re-created or re-updated object,
re-performing at least one failed creation-update test on the content of the new page for the re-created or re-updated object based on comparing the content of the new page for the re-created or re-updated object to the associated data or seeded data used to repopulate the page; and
displaying an indication of the success or failure of each of the creation-update tests.

7. A method performed by at least one processor comprising:
accessing application data from an application repository, the application data associated with an application comprising pages and navigations between the pages;
parsing the application data corresponding to a page of the application into a Document Object Model (DOM) for each page of the application, wherein the DOM defines a DOM tree comprising a hierarchy of nodes and traversal of the DOM for the page of the application comprises traversing the hierarchy of nodes of the DOM tree;
for each page of the application:
determining if the page creates, updates, or deletes an object of the application based on the DOM for the page;
based on the page not creating, updating, or deleting an object of the application, traversing the DOM for the page to collect navigation links to another page of the application;
based on the page creating, updating, or deleting an object of the application, traversing the DOM for the page to collect: input nodes and any data associated with an input field of the input nodes, buttons for creating, updating, or deleting an object of the application; and navigation links to another page of the application;

visiting each page of the application by starting with a first page of the application and, for each page of the application that has not been previously visited:

performing a navigation test of each of the collected navigation links of the page with one forward and one backward navigation of the link;

performing a function test of each of the collected buttons of the page for creating, updating, or deleting an object of the application by using the button to create, update, or delete an object and evaluating the results based on specified rules;

recording a success or failure of each performed test; and following a navigation link of the page or of a previously visited page to a next page of the application.

8. The method of claim 7, wherein the application is an HTML based web application and the pages of the application correspond to web pages.

9. The method of claim 7, further comprising performing the navigation test for each page by, for each of the collected navigation links of the page:

forwardly navigating the navigation link to another page of the application and displaying of an indication of a success or failure of the forward navigation of the navigation link; and backwardly navigating the navigation link from the other page of the application back to the page and displaying an indication of a success or failure of the backward navigation of the navigation link.

10. The method of claim 7, further comprising performing the function test for each page of the application that creates or updates an object an object by, for each of the collected input nodes of the page;

populating the input field of the input node with data from the associated data of the input field; or populating the input field of the input node with seeded data if no associated data is available for the input field; and for each of the collected buttons for creating or updating an object of the page:

creating or updating an object of the application; following a new navigation link of the page to a new page of the application for the created or updated object, performing creation-update tests on a content of the new page for the created or updated object based on comparing the content of the new page for the created or updated object to the associated data or seeded data used to populate the page; and displaying an indication of a success or failure of each of the creation-update tests.

11. The method of claim 10, further comprising performing the function test for each page that deletes an object by, for each of the collected buttons of the page:

deleting an object of the application;

following a new navigation link of the page to a new page of the application for the deleted object;

performing deletion tests on the content of the new page for the deleted object based on comparing the content to data associated with the deleted object of the page; and displaying an indication of the success or failure of each of the deletion tests.

12. The method of claim 10, further comprising, based on at least one of the creation-update tests failing, for each of the collected input nodes of the page associated with one of the at least one failed creation-update tests:

repopulating the input field of the input node with different data from the associated data of the input field; or repopulating the input field of the input node with different seeded data; and for each of the collected buttons of the page associated with one of the at least one failed creation-update tests:

re-creating or re-updating an object of the application associated with one of the at least one failed create-update tests:

following a new navigation link of the page to a new page of the application for the re-created or re-updated object, re-performing the at least one failed creation-update test on the content of the new page for the re-created or re-updated object based on comparing the content of the new page for the re-created or re-updated object to the associated data or seeded data used to repopulate the page; and displaying an indication of the success or failure of each of the creation-update tests.

13. A non-transitory machine-readable storage medium storing instructions which, when executed by at least one processor of a machine, cause the machine to perform operations comprising:

accessing application data from an application repository, the application data associated with an application comprising pages and navigations between the pages;

parsing the application data corresponding to a page of the application into a Document Object Model (DOM) for each page of the application, wherein the DOM defines a DOM tree comprising a hierarchy of nodes and traversal of the DOM for the page of the application comprises traversing the hierarchy of nodes of the DOM tree;

for each page of the application:

determining if the page creates, updates, or deletes an object of the application based on the DOM for the page;

based on the page not creating, updating, or deleting an object of the application, traversing the DOM for the page to collect navigation links to another page of the application;

based on the page creating, updating, or deleting an object of the application, traversing the DOM for the page to collect: input nodes and any data associated with an input field of the input nodes, buttons for creating, updating, or deleting an object of the application; and navigation links to another page of the application;

visiting each page of the application by starting with a first page of the application and, for each page of the application that has not been previously visited:

performing a navigation test of each of the collected navigation links of the page with one forward and one backward navigation of the link;

performing a function test of each of the collected buttons of the page for creating, updating, or deleting an object of the application by using the button to create, update, or delete an object and evaluating the results based on specified rules;

recording a success or failure of each performed test; and following a navigation link of the page or of a previously visited page to a next page of the application.

14. The non-transitory machine-readable storage medium of claim 13, wherein:

the application is an HTML based web application and the pages of the application correspond to web pages.

15. The non-transitory machine-readable storage medium of claim 13, the operations further comprising performing the navigation test for each page by, for each of the collected navigation links of the page:
   forwardly navigating the navigation link to another page of the application and displaying of an indication of a success or failure of the forward navigation of the navigation link; and
   backwardly navigating the navigation link from the other page of the application back to the page and displaying an indication of a success or failure of the backward navigation of the navigation link.

16. The non-transitory machine-readable storage medium of claim 13, the operations further comprising performing the function test for each page of the application that creates or updates an object by, for each of the collected input nodes of the page:
   populating the input field of the input node with data from the associated data of the input field; or
   populating the input field of the input node with seeded data if no associated data is available for the input field; and
   for each of the collected buttons for creating or updating an object of the page:
   creating or updating an object of the application;
   following a new navigation link of the page to a new page of the application for the created or updated object;
   performing creation-update tests on a content of the new page for the created or updated object based on comparing the content of the new page for the created or updated object to the associated data or seeded data used to populate the page; and
   displaying an indication of a success or failure of each of the creation-update tests.

17. The non-transitory machine-readable storage medium of claim 16, the operations further comprising performing the function test for each page that deletes an object by, for each of the collected buttons for deleting a created or updated object of the page:
   deleting an object of the application;
   following a new navigation link of the page to a new page of the application for the deleted object;
   performing deletion tests on the content of the new page for the deleted object based on comparing the content to data associated with the deleted object of the page; and
   displaying an indication of the success or failure of each of the deletion tests.

18. The non-transitory machine-readable storage medium of claim 16, the operations further comprising, based on at least one of the creation-update tests failing, for each of the collected input nodes of the page associated with one of the at least one failed creation-update tests:
   repopulating the input field of the input node with different data from the associated data of the input field; or
   repopulating the input field of the input node with different seeded data; and
   for each of the collected buttons of the page associated with one of the at least one failed creation-update tests:
   re-creating or re-updating an object of the application associated with one of the at least one failed create-update tests;
   following a new navigation link of the page to a new page of the application for the re-created or re-updated object,
   re-performing the at least one failed creation-update test on the content of the new page for the re-created or re-updated object based on comparing the content of the new page for the re-created or re-updated object to the associated data or seeded data used to repopulate the page; and
   displaying an indication of the success or failure of each of the creation-update tests.

* * * * *